United States Patent
Taguchi et al.

[11] Patent Number: 5,863,670
[45] Date of Patent: Jan. 26, 1999

[54] JOINTS OF TI-AL INTERMETALLIC COMPOUNDS AND A MANUFACTURING METHOD THEREFOR

[75] Inventors: Kohei Taguchi, Yokohama; Michihiko Ayada, Yokosuka, both of Japan

[73] Assignee: NHK Spring Co., Ltd., Yokohama, Japan

[21] Appl. No.: 634,401

[22] Filed: Apr. 18, 1996

[30] Foreign Application Priority Data

Apr. 24, 1995 [JP] Japan ................................ 7-120434

[51] Int. Cl.[6] ............................................. B32B 15/00
[52] U.S. Cl. ......................... 428/660; 428/615; 428/636; 428/651; 428/655; 428/654; 428/550; 428/567
[58] Field of Search ........................... 428/615, 636, 428/651, 655, 654, 660, 550, 567

[56] References Cited

U.S. PATENT DOCUMENTS

| | | | |
|---|---|---|---|
| 4,292,077 | 9/1981 | Blackburn et al. | 75/175.5 |
| 4,294,615 | 10/1981 | Blackburn et al. | 75/175.5 |
| 4,661,316 | 4/1987 | Hashimoto et al. | 420/418 |
| 4,668,282 | 5/1987 | Gillman et al. | 75/0.5 R |
| 4,668,470 | 5/1987 | Gillman et al. | 419/32 |
| 4,716,020 | 12/1987 | Blackburn et al. | 420/418 |
| 5,028,277 | 7/1991 | Mizoguchi et al. | 148/11.5 |
| 5,226,985 | 7/1993 | Kim et al. | 148/671 |
| 5,271,884 | 12/1993 | Huang | 420/418 |
| 5,562,999 | 10/1996 | Grunke et al. | 428/651 |
| 5,580,665 | 12/1996 | Taguchi et al. | 428/550 |
| 5,672,436 | 9/1997 | Tobin | 428/629 |

*Primary Examiner*—M. Nuzzolillo
*Assistant Examiner*—Steven H. Ver Steeg
*Attorney, Agent, or Firm*—Frishauf, Holtz, Goodman, Langer & Chick, P.C.

[57] ABSTRACT

A joint of Ti—Al intermetallic compounds, comprising a plurality of base members made of a Ti—Al intermetallic compound and having Ti—Al lamellar grains, and a junction provided between the base members, made of a Ti—Al intermetallic compound and having Ti—Al lamellar grains, wherein some of the lamellar grains of the junction extend into the base members, and some of the lamellar grains of each base member may extend into the junction or pass through the junction into the other base member.

3 Claims, 2 Drawing Sheets

JOINTS OF TI-AL INTERMETALLIC COMPOUNDS AND A MANUFACTURING METHOD THEREFOR

BACKGROUND OF THE INVENTION

1. Field of the Invention

The present invention relates to joints of Ti—Al intermetallic compounds adapted for components of various apparatuses, fireproof constructions, springs for high-temperature use, etc., and a method for manufacturing the same.

2. Description of the Related Art

Ti—Al intermetallic compounds are promising materials that have outstanding properties, such as high resistance to heat, acid, wear, etc. and light weight, and can, therefore, be used in various applications. Typical products that are expected to utilize the intermetallic compounds of this type include outer wall materials, turbine components, and engine components, such as pistons and valve systems.

A structure that includes lamellae is known as a mode of a Ti—Al intermetallic compound. A Ti—Al lamella is a layered structure in which sheetlike grains composed mainly of gamma phases (TiAl) and ones composed mainly of $\alpha_2$ phases (Ti$_3$Al) are substantially alternately arranged in layers, and is very strong. The inventors hereof formerly disclosed high-strength Ti—Al intermetallic compounds and a manufacturing method therefor, in Jpn. Pat. Appln. KOKAI Publication Nos. 6-172899 and 6-264203. In these prior art intermetallic compounds, adjacent lamellar grains are coupled directly to one another without any other continuous phases interposed between them.

In some cases, the manufacturing costs of products that are composed of the Ti—Al intermetallic compounds can be lowered by forming each product from a plurality of separately manufactured components, which are bonded together when the product is to be completed. If two base members that are composed of Ti—Al intermetallic compounds are bonded together by means of conventional diffused junctions, however, the junctions inevitably constitute mechanically weak points.

SUMMARY OF THE INVENTION

Accordingly, the object of the present invention is to provide joints of Ti—Al intermetallic compounds, which enjoy high bonding strength and can fully exhibit the high strength characteristics inherent in Ti—Al lamellae even at high temperature, in particular, and a method for manufacturing the same.

To achieve the object, a Ti—Al intermetallic joint according to the present invention comprises a plurality of base members made of a Ti—Al intermetallic compound and having lamellar grains, and a junction provided between the base members, made of a Ti—Al intermetallic compound and having lamellar grains, wherein some Ti—Al lamellar grains of the junction and some Ti—Al lamellar grains of the base members are directly connected to one another, and/or some Ti—Al lamellar grains of each base member pass through the junction into the other base member and are directly connected to some of the lamellar grains of the other base member.

A manufacturing method for a joint of Ti—Al intermetallic compounds according to the invention comprises the steps of manufacturing a plurality of base members formed of a Ti—Al intermetallic compound, arranging an insert material, a mixture of a plurality of metallic phases composed mainly of aluminum and titanium, between the base members, and heating the base members to a temperature area such that the insert material becomes a Ti—Al intermetallic compound and reactively bonding the base members.

DETAILED DESCRIPTION OF THE PREFERRED EMBODIMENTS

Figure 1:
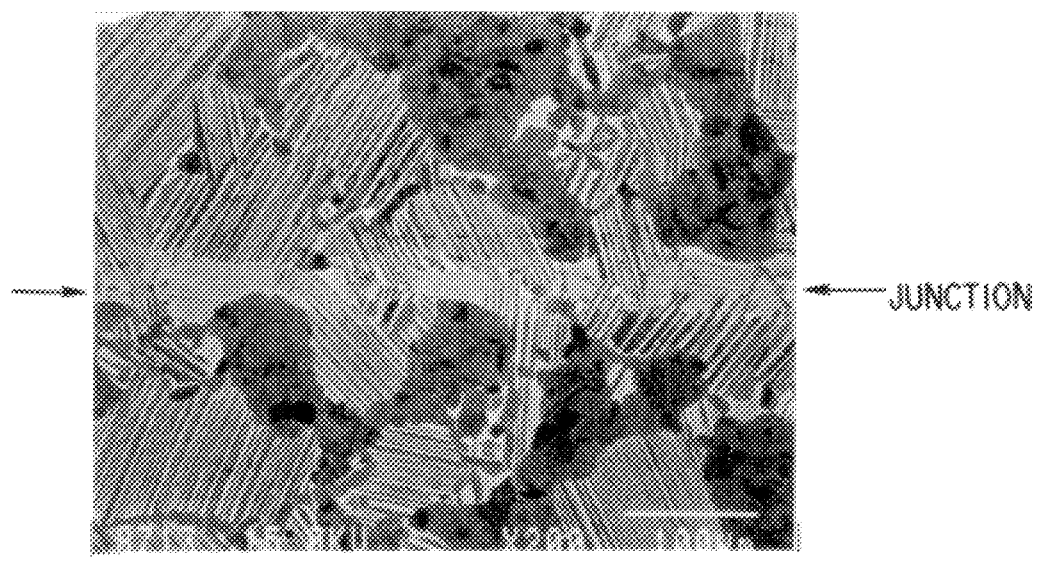
FIG. 1 is an electron micrograph showing the metallic structure of a junction of a joint of Ti—Al intermetallic compounds of EXAMPLE 1 according to the present invention.

The present invention will now be described further in detail.

A manufacturing process according to the present invention comprises the following four stages.

[First Stage (Manufacture of Base Member)]

A base member based on a Ti—Al intermetallic compound may be manufactured by (a) reactive sintering or (b) casting, for example. The aluminum content of the member may be any value such that lamellae can be formed, preferably ranging from 35 to 50 atom %. Further preferably, the aluminum content should be within a range of 41 to 50 atom %, which permits the formation of an ($\alpha+\gamma$) dual phase area incorporating alpha and gamma phases. In order to improve its properties, the system may be loaded with additive elements, such as Si, Nb, Mn, Cr, V, Pb, etc., or hardened fine deposits formed of ceramics or intermetallic compounds, such as TiB$_2$, Y$_2$O$_3$, Ti$_5$Si$_3$, etc.

(a) Reactive Sintering: Powders of titanium and aluminum are weighed and mixed so that an intended composition is obtained. After a stainless-steel pipe is filled with the powder mixture, it is swaged by means of a rotary swaging machine, whereupon a mixed green compact is obtained. A Ti—Al intermetallic compound is synthesized by heated under pressure by pseudo-hot isostatic pressing (pseudo-HIP), for example. The pseudo-HIP is a pressurizing method which uses ceramic powder, such as alumina, as a pressure transmitting medium. As the mixed compact of titanium and aluminum is pressurized and heated by the pseudo-HIP, it undergoes a partial reaction. Heat produced during this reaction causes the reaction to propagate gradually and sintering to advance at the same time. Accordingly, the reactive sintering is also referred to as self-combustion sintering or self-propagating high-temperature synthesis.

(b) Casting: A powder mixture of titanium and aluminum is melted by, for example, plasma-arc melting, and poured into a mold, whereupon a base member based on a Ti—Al intermetallic compound is obtained.

Alternatively, a base member may be formed from powders of intermetallic compounds, such as TiAl and Ti$_3$Al, by conventional sintering or pressure sintering based on HIP. In some cases, the manufactured base member may be subjected to forging or the like so that its structure is fine.

If necessary, the base member structure may be controlled by heat-treating the base member manufactured in the aforesaid manner. The temperature for this heat treatment is restricted within the range of $(T\alpha \pm 100)°$ C., where $T\alpha$ is a temperature at which the gamma phase starts to be precipitated when the Ti—Al intermetallic compound heated to an alpha single phase area is cooled. The value of $T\alpha$ varies depending on the composition of the Ti—Al intermetallic compound and the additive elements. If the aluminum content of the compound is 48% as compared with 52% titanium content, for example, the temperature $T\alpha$ is about 1,375° C. If the aluminum content is 47%, the temperature $T\alpha$ is about 1,350° C. In the case of the aluminum content is 46%, the temperature $T\alpha$ is about 1,325° C. The structure of the base member thus formed from the Ti—Al intermetallic compound, which is not restricted in particular, may be of any of the following three types.

(A) Duplex Structure: Mixed structure composed of Ti—Al lamellar grains (layered structure consisting of alternate layers of sheetlike gamma and $\alpha_2$ grains) and equi-axed gamma grains.

(B) Fully Lamellar Structure: Structure formed entirely of Ti—Al lamellar grains.

(C) Dual Phase Structure: Lamella-free structure composed of fine equi-axed gamma and $\alpha_2$ grains.

These structures are suitably selected depending on purposes. Preferably, the structure of finally obtained joints should be the duplex or fully lamellar structure. While the duplex structure is higher in mechanical strength than the fully lamellar structure, the latter is higher in heat resistance.

[Second Stage (Manufacture of Insert Material)]

Available for use as an insert material is a mixture of a metallic phase composed mainly of titanium, which constitutes the Ti—Al intermetallic compound of the base member, and a metallic phase composed mainly of aluminum. For example, the insert member may be a layered structure consisting of alternate layers of titanium and aluminum leaves or be formed by plating the joint surface of the base member with titanium and/or aluminum. The metallic phases may be alloy phases. For example, the insert material may be a leaf or powder that is formed of titanium, as a principal component (more than 50%), and less than 50% of aluminum or other metallic element mixed therewith or dissolved in a solid phase therein. Also, the insert material may be a powder mixture, formed of, e.g., titanium powder and aluminum powder, or a mixture of powder and leaves, such as titanium powder and aluminum leaves. For fine adjustment of the composition of the insert material, moreover, aluminum powder may be interposed between titanium and aluminum leaves.

Furthermore, the same additive elements (niobium, chromium, manganese, etc.) or hardened fine deposits (powder or fibers of intermetallic compounds or ceramics) that are used in the base member may be added, in the form of powder or fibers, to the insert material. Alternatively, the additive elements or hardened fine deposits may be deposited in layers on the insert material. These elements or deposits are used in order to facilitate the manufacture of the insert material or reactive bonding in a subsequent stage or to improve the mechanical properties of joints. Preferably, however, laminar bodies such as leaves should be used in order to advance the reaction uniformly in a third stage, which will be mentioned later.

In any case, the insert material used is expected to be able to become a Ti—Al intermetallic compound. Before the bonding, however, the insert material is formed mainly of a substance which has not become a Ti—Al intermetallic compound yet. The composition ratio between titanium and aluminum in the insert material is adjusted to an optimum value in consideration of the bonding strength of a joint formed in the following third stage.

[Third Stage (Reactive Bonding)]

The insert material, which is the mixture of the metallic phases composed mainly of titanium and aluminum, is sandwiched between the respective join surfaces of two base members. These base members are bonded together (reactive bonding) by heating the resulting structure to a temperature such that the insert material can become a Ti—Al intermetallic compound. Thereupon, reactions advance in the insert material and the interfaces between the insert material and the base members at the same time. Thus, a joint with high bonding strength can be obtained without involving a substantial number of voids. Since the reactions advance uniformly under pressure, if any, uniform interfaces of joints with relatively few voids can be obtained, so that the bonding strength of the joints is improved.

Preferably, the bonding should be carried out at the pressure of 0.1 to 3,000 MPa (megapascals) and temperature of 450° to 1,300° C. If the pressure is lower than 0.1 MPa, the pressurization produces no substantial effect. If the pressure exceeds 3,000 MPa, there is a high possibility of the base members being broken. If the heating temperature is lower than 450° C., the reaction of the insert material cannot advance with ease. If the temperature exceeds 1,300° C., the base members are deformed conspicuously. Preferably, the heating temperature should be not higher than 1,000° C. and not lower than the melting point of the phase which is composed mainly of aluminum. If the heating temperature is not lower than the melting point of the aluminum-based phase, the reaction of the insert material can be advanced rapidly. Accordingly, liquid phases produced by heat attributable to the reaction or by the fusion of the aluminum-based phase can be effectively utilized for the bonding. In some cases, moreover, more liquid phases can be produced for more effective bonding by adjusting the heating rate to 10° C./min or more. If the heating temperature is not higher than 1,000° C., furthermore, the deformation of the base members can be reduced considerably.

[Fourth Stage (Heat Treatment after Bonding)]

If a lamella fitting structure is obtained at the junction between the base members in the third stage, heat treatment of this fourth stage is not essential. The "lamella fitting structure" is a structure in which some of the lamellar grains of the junction and base members are directly connected to one another, and/or some of the lamellar grains of each base member pass through the junction into the other base member and are directly connected to some of the lamellar grains of the other base member, thereby forming a serrated lamellar grain boundary. Normally, however, the heat treatment (fourth stage) is carried out in order to adjust the structures of the base members and the junction. Preferably, this heat treatment should be conducted within a temperature range of $(T\alpha \pm 100)°$ C. If the temperature exceeds $(T\alpha + 100)°$ C., the lamellar grain size is so large that the strength lowers. If the temperature is lower than $(T\alpha - 100)°$ C., on the other hand, the diffusion of the component metals cannot advance satisfactorily, so that the lamella fitting structure cannot be easily formed at the junction. Preferably, the lamellar grain size ranges from about 5 to 1000 μm. Depending on the structures of the final joints to be obtained, preferred heat treatment conditions are selected as follows.

(a) A case in which each bonded base member is composed of a duplex structure of lamellar grains and equi-axed gamma grains, and final joints having the same structure are expected to be obtained. In this case, it is advisable to subject the base members to a heat treatment such that the materials are kept within a temperature range of (Tα−100) to Tα° C. for a predetermined period of time, where Tα is the temperature at which the gamma phase is precipitated from the alpha phase. If the heat treatment is conducted at a temperature not lower than Tα for more than 2 hours, the joint structure may change into a fully lamellar structure, in some cases. It is advisable, therefore, to adjust the maximum heating temperature to Tα or below. If the heat treatment is short, however, the joint may possibly be heated to a temperature higher than Tα.

(b) A case in which the bonded base members are formed of fully lamellar structures, and final joints having the same structure are expected to be obtained. In this case, it is advisable to subject the base members to a heat treatment such that the members are kept within a temperature range of (Tα−100) to Tα° C. for a predetermined period of time, or to a heat treatment such that the members are heated to a temperature of Tα to (Tα+100)° C. and then kept within the temperature range of (Tα−100) to Tα° C.

(c) A case in which the unbonded base members are formed of dual phase structures substantially including no lamellae. In this case, the members must be subjected to either the heat treatment (a) or (b), depending on the structures of the final joints to be obtained, and lamellae are formed by the heat treatment.

Preferably, the hold time ranges from 0.1 to 100 hours. If the hold time is shorter than 0.1 hour, it is difficult to form uniform structures. If the hold time exceeds 100 hours, the operating time is too long. The lower the heat treatment temperature, in this case, the longer the heat treatment time is expected to be.

By the method described above, there may be obtained joints of Ti—Al intermetallic compounds which enjoy very high bonding strength and can fully exhibit the high strength characteristics inherent in lamellae even at high temperature, in particular.

EXAMPLE 1

Powders of titanium and aluminum were weighed and mixed so that the aluminum content was 48 atom % as compared with 52% titanium content, and a stainless-steel pipe was filled with the resulting powder mixture. Thereafter, a mixed green compact was prepared by using a rotary swaging machine, and was subjected to reactive sintering by pseudo-HIP. Thereupon, a base member formed of a Ti—Al intermetallic compound was obtained having the shape of a round bar and a nearly full density. This base member (round bar) was heat-treated in a normal-pressure argon gas flow so that it was kept within the temperature range of (Tα−100) to Tα° C., that is, at the temperature for the (α+γ) dual phase area, for a predetermined period of time (specifically, at 1,350° C. for 2 hours), whereupon a base member for bonding, having a duplex structure, was obtained. The joint surface of this base member was ground.

Then, titanium and aluminum leaves were alternately arranged in layers to form an insert material. The composition of the insert material was adjusted by changing the ratio between the respective overall thicknesses of the titanium and aluminum leaves. Thus, the insert material fabricated in EXAMPLE 1 is richer in titanium than the base member.

Subsequently, the insert material was sandwiched between the respective flat end faces of the two base members, and the members were pressurized at 50 MPa by means of a uni-directional press as they were heated to 900° C. for reactive bonding, whereupon a joint was obtained. Further, the joint was heat-treated in a normal-pressure argon gas flow so that it was kept within the temperature range of (Tα−100) to Tα° C., that is, at the temperature for the (α+γ) dual phase area, for 100 minutes, and the joint interface was subjected to structure control. Preferably, the hold time for this heat treatment is restricted to 10 hours or less. If the hold time exceeds 10 hours, the grains become so coarse that the strength is lowered considerably, in some cases.

COMPARATIVE EXAMPLE 1

COMPARATIVE EXAMPLE 1 differs from EXAMPLE 1 only in that the insert material used was richer in aluminum than the base members.

Figure 2:
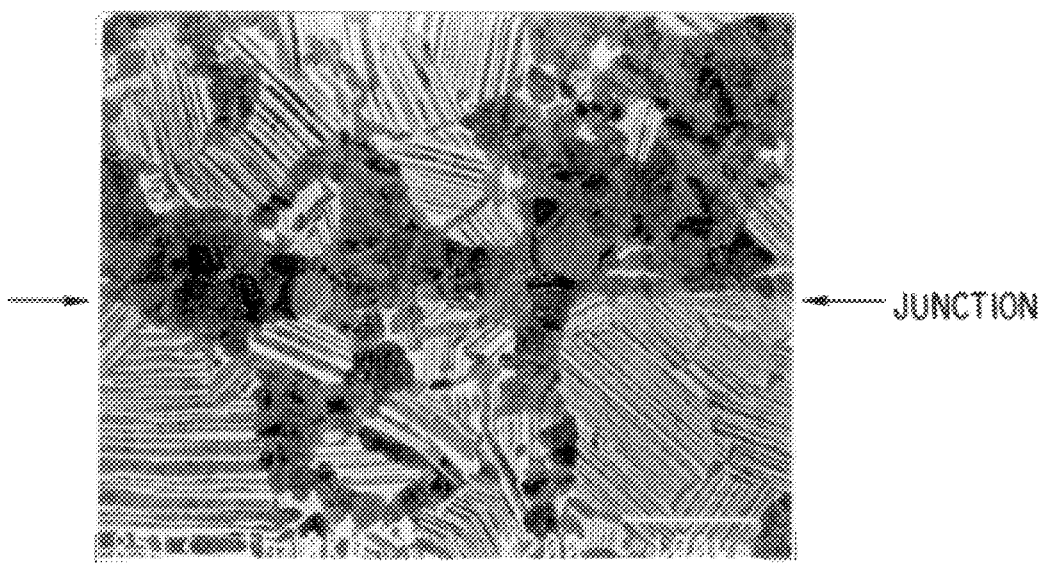
FIG. 2 is an electron micrograph showing the metallic structure of a junction of a joint of Ti—Al intermetallic compounds of COMPARATIVE EXAMPLE 1.

The structures of various junctions of joints of EXAMPLE 1 and COMPARATIVE EXAMPLE 1 were observed by means of an electron microscope. FIG. 1 is an electron micrograph showing a junction of the joint of EXAMPLE 1, FIG. 2 is an electron micrograph showing a junction of the joint of COMPARATIVE EXAMPLE 1. In either case, the magnification is ×180. Based on these micrographs, the percentages of voids at the junctions were calculated. Also, the breaking strength was measured at room temperature and at 800° C. in a tension test. Table 1 shows the results of measurement of the properties of the joints.

TABLE 1

|  | Composition of Insert Material | Percentage of Voids (%) | Testing Temperature | Breaking Strength (kgf/mm$^2$) | Breaking Point |
| --- | --- | --- | --- | --- | --- |
| EXAMPLE 1 | Ti rich | 0.5 or less | Room Temperature | 37.6 | Base member |
|  |  |  | 800° C. | 42.7 | Base member |
| COMPARATIVE EXAMPLE 1 | Al rich | 0.5 or less | Room Temperature | 35.6 | Junction |
|  |  |  | 800° C. | 39.0 | Junction |

As shown in FIG. 1, the junction of the joint of EXAMPLE 1 is formed of a Ti—Al intermetallic compound having Ti—Al lamellar grains that are newly produced from the insert material. This junction includes portions (lamella fitting structures) in which lamellar grains produced from the insert material and lamellar grains of the base members are fitted in one another and portions (lamella fitting structures) in which lamellar grains extending from the base members on either side of the junction are fitted in one another so that the base members are coupled directly with each other. In the joint of EXAMPLE 1, the base members fractured when subjected to the tension test. This is because the lamella fitting structures at the junction were so strong that the junction never fractured before the base members did.

As shown in FIG. 2, on the other hand, the joint of COMPARATIVE EXAMPLE 1 includes a continuous gamma phase along the joint interface. When the joint of COMPARATIVE EXAMPLE 1 was subjected to the tension test, the junction fractured. This is because the fracture advanced along the gamma phase.

Preferably, the composition of the aforesaid joint should be identical with the composition (titanium=52 atom %; aluminum=48 atom %) of the base members or richer in titanium. The upper limit of the titanium content is 15 atom % richer than the base member. Thus, in this EXAMPLE, it is advisable to use an insert material whose titanium content ranges from 52 to (52+15) atom % as compared with 48 to 33 atom % aluminum content. If the composition is deviated from this range, the strength of the junction may possibly be lowered. If the titanium content at the junction is higher than the aforesaid upper limit, it is difficult to form lamella fitting structures along the joint interface.

EXAMPLE 2

Powders of titanium and aluminum were weighed and mixed so that the aluminum content was 46 atom % as compared with 54% titanium content, and a stainless-steel pipe was filled with the resulting powder mixture. Thereafter, a mixed green compact was prepared by using the rotary swaging machine, and was subjected to reactive sintering by pseudo-HIP. Thereupon, a base member formed of a Ti—Al intermetallic compound was obtained having the shape of a round bar and a substantially full density. This base member (round bar) was heat-treated in a normal-pressure argon gas flow so that it was kept within the temperature range of $T\alpha$ to $(T\alpha+100)°$ C. (alpha single phase area) for a predetermined period of time (specifically, at 1,350° C. for 2 hours), whereupon a base member for bonding, having a fully lamellar structure, was obtained. The joint surface of this base member was ground.

Then, titanium and aluminum leaves were alternately arranged in layers to form an insert material having substantially the same composition as the base member. Subsequently, the insert material was sandwiched between the respective flat end faces of the two base members, and the members were pressurized at 50 MPa by means of a uni-directional press as they were heated to 900° C. for reactive bonding, whereupon a joint was obtained. Further, the joint was heat-treated in a normal-pressure argon gas flow so that it was kept within the temperature range of $(T\alpha\pm100)°$ C. for about 100 minutes, and the joint interface was subjected to structure control. The hold time for the temperature range of $(T\alpha-100)°$ C. to $T\alpha°$ C., included in the aforesaid temperature ranges, was 10 minutes or more.

For the joint of EXAMPLE 2 thus obtained, the structures of junctions were observed by means of the electron microscope, and the percentages of voids at the junctions were calculated. Also, the breaking strength was measured at room temperature and at 800° C. in the tension test. Table 2 shows the results of the measurement.

TABLE 2

|  | Testing Temperature | Breaking Strength (kgf/mm$^2$) | Breaking Point |
|---|---|---|---|
| EXAMPLE 2 | Room Temperature | 41.5 | Base member |
|  | 800° C. | 43.9 | Base member |

In the joint of EXAMPLE 2, lamella fitting structures were observed along the joint interfaces of the junctions. The percentages of voids along the joint interfaces were 0.5% or less. When the joint of EXAMPLE 2 was subjected to the tension test, the base members fractured. Thus, it was found that a joint with high bonding strength can be obtained by forming the lamella fitting structures along the joint interfaces even in the case where the base members have a fully lamellar structure.

In order to give the joint interfaces a desired structure, it is advisable to render the composition of the insert material richer in titanium than that of the base members. The upper limit of the titanium content is 90 atom %. If the titanium content at the junctions is too high, it is difficult to form the lamella fitting structures along the joint interfaces. In some cases, the lamella fitting structures can be obtained if the composition of the insert material is rendered 15 atom % richer in aluminum (61 atom % Al and 39 atom % Ti) than the composition (46 atom % Al) of the base member by changing the thickness of the insert material, controlling the bonding conditions, e.g., suddenly increasing the temperature at a rate of 20° C./min or more to accelerate exothermic reaction, or suitably controlling the heat treatment conditions. Thus, according to EXAMPLE 2, the insert material used may enjoy content ratios between titanium and aluminum which range from 90:10 to 39:61.

EXAMPLE 3

Titanium and aluminum were weighed and mixed so that the aluminum content was 47 atom % as compared with 53% titanium content, melted by plasma-arc melting, and poured into a mold. After the mixture was solidified, it was cut into square blocks. These blocks were ground to form base members for bonding, having a fully lamellar structure.

Then, titanium and aluminum leaves were alternately arranged in layers to form an insert material having substantially the same composition as the base members. Subsequently, the insert material was sandwiched between the two base members, and the members were pressurized at 50 MPa by means of a uni-directional press as they were heated to 900° C. for reactive bonding, whereupon a joint was obtained. Further, the joint was heat-treated in a normal-pressure argon gas flow so that it was kept within the temperature range of $(T\alpha-100)$ to $T\alpha°$ C. for about 100 minutes, and the joint interface was subjected to structure control. Preferably, the hold time for this heat treatment is restricted to 10 hours or less.

COMPARATIVE EXAMPLE 2

COMPARATIVE EXAMPLE 2 differs from EXAMPLE 3 only in that the same base members were bonded together without using the insert material.

Figure 3:
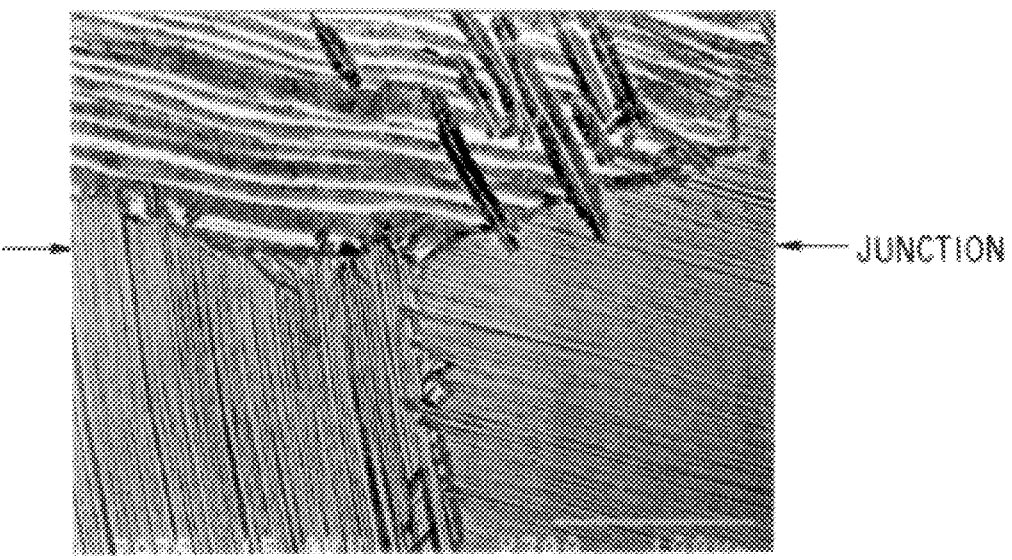
FIG. 3 is an electron micrograph showing the metallic structure of a junction of a joint of Ti—Al intermetallic compounds of EXAMPLE 3 according to the present invention.
Figure 4:
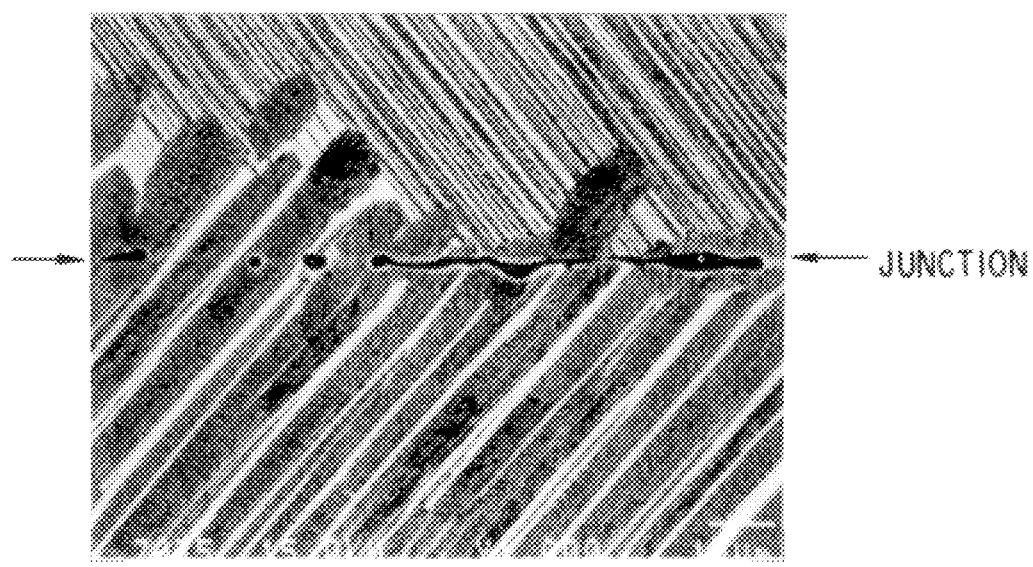
FIG. 4 is an electron micrograph showing the metallic structure of a junction of a joint of Ti—Al intermetallic compounds of COMPARATIVE EXAMPLE 2.

For the joints of EXAMPLE 3 and COMPARATIVE EXAMPLE 2 thus obtained, the structures of junctions were observed by means of the electron microscope, and the percentages of voids at the junctions were calculated. FIG. 3 is an electron micrograph showing a junction of the joint of EXAMPLE 3, and its magnification is ×270. FIG. 4 is an electron micrograph showing a junction of the joint of COMPARATIVE EXAMPLE 2, and its magnification is ×1,000. Also, one end of each joint was mechanically fixed, the other end was hammered, and breaking points were observed (hammering test).

As shown in FIG. 3, the junction of the joint of EXAMPLE 3 is formed of a Ti—Al intermetallic compound having Ti—Al lamellar grains that are newly produced from the insert material. This junction includes portions in which Ti—Al lamellar grains produced from the insert material and Ti—Al lamellar grains of the base members are fitted in one another and/or portions (lamella fitting structures) in which Ti—Al lamellar grains extending from the two base members are fitted in one another so that the base members are coupled directly with each other. In the joint of EXAMPLE 1, the percentage of voids along the joint interface was 0.5% or less, and the base members were broken when subjected to the hammering test. Thus, it was found that a joint with high bonding strength can be obtained by forming the lamella fitting structures along the joint interfaces even in the case where the base members are manufactured by casting, as in the case of EXAMPLE 3.

In the joint of COMPARATIVE EXAMPLE 2, as shown in FIG. 4, on the other hand, voids (black spots in FIG. 4) were observed along the joint interface, although Ti—Al lamella fitting structures were recognized. The percentage of voids along the joint interface of COMPARATIVE EXAMPLE 2 was about 5%, and the joint was broken along the joint interface when subjected to the hammering test.

Also when the joint of the EXAMPLE 3 was heat-treated after the bonding so that it was kept at Tα to (Tα+100)° C. to for about 100 minutes and then continuously cooled to be kept within the temperature range of (Tα−100) to Tα° C. for about 10 minutes, lamella fitting structures were formed along the joint interface, and the percentage of voids was 0.5% or less. Preferably, in this heat treatment, the hold time for the temperature range of (Tα−100) to Tα° C. for the continuous cooling should be restricted within 100 minutes. If the hold time exceeds 100 minutes, equi-axed gamma grains may be precipitated, so that no lamella fitting structures can be formed along the along the joint interface, in some cases.

EXAMPLE 4

Powders of titanium and aluminum were weighed and mixed so that the aluminum content was 48 atom % as compared with 52% titanium content, and a stainless-steel pipe was filled with the resulting powder mixture. Thereafter, a mixed green compact was prepared by using the rotary swaging machine, and was subjected to reactive sintering by pseudo-HIP (at 1,100° C. for 2 hours). Thereupon, a base member for bonding, formed of a Ti—Al intermetallic compound, was obtained having the shape of a round bar and a substantially true density. This base member was found to have a dual phase structure. The joint surface of the base member was ground.

Then, titanium and aluminum leaves were alternately arranged in layers to form an insert material having substantially the same composition as the base member. Subsequently, a joint was obtained by carrying out the reactive bonding in the same manner as in EXAMPLE 1. Thereafter, the joint interface was subjected to structure control by heat-treating the joint so that it was kept within the temperature range of (Tα−100) to Tα° C. for about 100 minutes, in the same manner as in EXAMPLE 1.

For the joint of EXAMPLE 4 thus obtained, the structures of junctions were observed by means of the electron microscope, and the percentages of voids at the junctions were calculated. Also, the breaking strength was measured at room temperature and at 800° C. in the tension test. Table 3 shows the results of the measurement.

TABLE 3

|  | Testing Temperature | Breaking Strength (kgf/mm$^2$) | Breaking Point |
| --- | --- | --- | --- |
| EXAMPLE 4 | Room Temperature | 40.6 | Base member |
|  | 800° C. | 42.7 | Base member |

In the joint of EXAMPLE 4, the base member structure was changed into a duplex structure, and lamella fitting structures were observed along the joint interface. The percentage of voids along the joint interface was 0.5% or less. When the joint of EXAMPLE 4 was subjected to the tension test, the base members fractured. Thus, it was found that a joint with high bonding strength can be obtained by changing the base member structure into the duplex structure by heat treatment and forming the lamella fitting structures along the joint interfaces, even in the case where the base members have no lamellae before they are bonded together.

EXAMPLE 5

A plurality of joints having lamella fitting structures and different percentages of voids at junctions were obtained under various manufacturing conditions. These joints were classified into three groups depending on the percentages of voids, 0.5% or less, 4% to less than 5%, and 5% to less than 6.5%. Five samples were selected from each group and subjected to the hammering test to check the base members or junctions for the number of fractures.

This hammering test showed that, the joints which has a void percentage of less than 5% fractured more frequently at the base members than at the junction.

TABLE 4

|  |  | Breaking Point |  |
| --- | --- | --- | --- |
| Insert Material | Percentage of Voids (%) | Base member | Junction |
| Employed | 0.5 or less | 5 | 0 |
| None | 4 to less than 5 | 3 | 2 |
| None | 5 to less than 6.5 | 0 | 5 |

What is claimed is:

1. A joint of Ti—Al intermetallic compounds, comprising:

a plurality of base members made of a Ti—Al intermetallic compound and having Ti—Al lamellar grains; and a junction provided between the base members, made of a Ti—Al intermetallic compound and having Ti—Al lamellar grains, wherein some Ti—Al lamellar grains of the junction and some Ti—Al lamellar grains of the base members are directly connected to one another, and/or some Ti—Al lamellar grains of each base member pass through the junction into the other base member and are directly connected to some of the lamellar grains of the other base member, and wherein the joint has an upper limit of titanium content which is 15 atom % richer than the base members.

2. A joint of Ti—Al intermetallic compounds according to claim 1, wherein the percentage of voids in the junction is less than 5%.

3. A joint of Ti—Al intermetallic compounds according to claim 1, wherein the joint has a composition of 52 to 67 atom % titanium and 48 to 33 atom % aluminium.

* * * * *